United States Patent
Schnitzer

(10) Patent No.: US 7,662,063 B2
(45) Date of Patent: Feb. 16, 2010

(54) METHOD FOR OPERATING A DRIVE TRAIN OF A MOTOR VEHICLE

(75) Inventor: Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 398 days.

(21) Appl. No.: 11/804,331

(22) Filed: May 17, 2007

(65) Prior Publication Data
US 2007/0288150 A1  Dec. 13, 2007

Related U.S. Application Data

(63) Continuation-in-part of application No. PCT/EP2005/012015, filed on Nov. 10, 2005.

(51) Int. Cl.
*B60W 10/00* (2006.01)
*B60W 10/02* (2006.01)
*B60W 10/04* (2006.01)
*G06F 7/00* (2006.01)
*G06F 17/00* (2006.01)

(52) U.S. Cl. .................... 477/70; 477/180; 477/906; 701/65; 701/67

(58) Field of Classification Search ............ 477/70, 477/180, 906; 701/62, 65, 67, 68
See application file for complete search history.

(56) References Cited

U.S. PATENT DOCUMENTS

| 6,428,447 | B2* | 8/2002 | Onuki | 477/99 |
| 6,634,983 | B2* | 10/2003 | Nishimura | 477/85 |
| 2006/0211536 | A1* | 9/2006 | Guggolz et al. | 477/34 |
| 2008/0034905 | A1* | 2/2008 | Hatori et al. | 74/330 |

FOREIGN PATENT DOCUMENTS

| EP | 6 676 566 | 10/1995 |
| WO | WO 02/092378 | 11/2002 |
| WO | WO 03/036137 | 5/2003 |
| WO | WO 2004/037590 | 5/2004 |

* cited by examiner

*Primary Examiner*—Tisha D Lewis
(74) *Attorney, Agent, or Firm*—Klaus J. Bach

(57) ABSTRACT

In a method of operating a drive train of a motor vehicle including a drive motor with a multi-unit transmission including an unsynchronized main transmission and a synchronized output drive unit, wherein, for performing a shift in the unsynchronized main transmission, a speed synchronization is carried out by means of the drive motor for the engagement of a target gear and, in an emergency mode of the drive motor, a clutch arranged between the drive motor and the main transmission is disengaged, the output gear unit is placed into neutral, the target gear is engaged, the output drive unit is placed into a drive position and the clutch is at least partially engaged.

8 Claims, 2 Drawing Sheets

METHOD FOR OPERATING A DRIVE TRAIN OF A MOTOR VEHICLE

This is a Continuation-in-Part Application of pending International Patent Application PCT/EP2005/012015 filed Nov. 10, 2005 and claiming the priority of German Patent Application 10 2004 055 85734 filed Nov. 19, 2004.

BACKGROUND OF THE INVENTION

The invention relates to a method of operating a drive train of a motor vehicle with a motor whose torque is transmitted to the drive wheels via the drive train which includes an unsynchronized main transmission and a synchronized output drive unit.

EP 0 676 566 A1 discloses a method for operating a motor vehicle having an engine and a transmission with an unsynchronized main transmission and a synchronized output drive unit. Arranged between the drive motor and the transmission is a clutch which is actuated by external force. The necessary adaptation of the rotational speed of a transmission input shaft, the so-called synchronization to a synchronous rotational speed of the target gear, in the event of a shift from an original gear to a target gear in the main transmission is carried out by means of the drive motor. Here, the synchronous rotational speed of the target gear is that rotational speed of the transmission input shaft which is generated at the momentary speed of the motor vehicle with the target gear selected.

The synchronization cannot be carried out reliably if the drive motor is not fully functional, that is to say is in an emergency mode. Since the main transmission is embodied as an unsynchronized transmission, there is the risk that the original gear is disengaged but the target gear cannot be engaged. There is therefore no drive connection between the drive motor and driven vehicle wheels. The drive motor therefore cannot be utilized either to accelerate or decelerate the motor vehicle.

It is the object of the present invention to provide a method of operating a drive train including an unsynchronized main transmission and a synchronized output drive unit in such a way that smooth engagement of a target gear can be ensured.

SUMMARY OF THE INVENTION

In a method of operating a drive train of a motor vehicle including a drive motor with a multi-unit transmission including an unsynchronized main transmission and a synchronized output drive unit, wherein for performing a shift in the unsynchronized main transmission, a speed synchronization is carried out by means of the drive motor for the engagement of a target gear and, in an emergency mode of the drive motor, the following steps are performed:

disengaging a clutch arranged between the drive motor and the main transmission
setting a neutral position in the output gear unit,
engaging the target gear,
setting a drive position in the output gear unit and
at least partially engaging the clutch.

When an emergency mode of the drive motor is identified by the control device, first, the clutch is opened and the drive motor is thereby separated from the transmission. The output drive unit is subsequently placed into a neutral position in which the drive connection between the transmission and the driven vehicle wheels is interrupted. The output drive unit has at least two drive positions, with different transmission ratios, in which it transmits torque. Said rear-mounted group can for example be embodied as a so-called range or split group. The main transmission which is a gearwheel change transmission is thereby separated both from the input drive and from the output drive, and no torque can be backed up either at the input drive or at the output drive. In a subsequent step, the target gear is engaged by actuating suitable actuators in the main transmission.

When the main transmission is connected to the drive input and the drive output, the target gear can be engaged only if there is no or only a small rotational speed difference between the shift element, for example a sliding sleeve, and a loose wheel of the target gear. In the event of an excessively high rotational speed difference, the form-fitting connection cannot be produced between the shift element and the loose wheel.

After the separation of the connections to the drive input and to the drive output, during the rotational speed adaptation of the shift element and the loose wheel, large rotational masses must no longer be accelerated, so that the rotational speed alignment and the subsequent engagement of the target gear is possible even without additional synchronizing devices. After the engagement of the target gear, a drive position is again set in the rear-mounted group, that is to say the connection to the output drive is produced and the clutch is at least partially closed. The setting of the drive position in the rear-mounted group is carried out in particular before the closure of the clutch. Said setting can however also be carried out after the closure of the clutch.

This ensures that the target gear in the main transmission can be engaged even in an emergency mode of the drive motor. The drive motor can therefore be used to accelerate and decelerate the motor vehicle. Unsafe situations in which the vehicle can only roll without drive can thereby be prevented.

Transmissions with rear-mounted groups are used in particular in utility vehicles. In utility vehicles, very high steering forces are necessary, and therefore a utility vehicle without steering assistance is very difficult to control. If the drive motor is no longer operational, a steering assistance pump which is driven by the drive motor and is required for the steering assistance is no longer driven. With the method according to the invention, it can be ensured that, for as long as the motor vehicle is traveling, the drive motor is forced to rotate and the steering assistance pump can thus still operate. This permits reliable operation of the motor vehicle even in the event of a failure of the drive motor. If it were not possible to ensure the operation of the power steering pump, then a further power steering pump would have to be provided, which would need to be driven at least indirectly by means of the vehicle wheels. This would require additional costs and installation space.

The control device can identify an emergency mode of the drive motor for example if an actuator or a sensor of the drive motor signals a fault. An emergency mode can also be identified if the drive motor reacts incorrectly to demands, for example for a change of an output torque, or a signal connection between the control device and the drive motor is broken.

The control device can also actuate the drive motor, the transmission and/or the clutch indirectly by virtue of the control device being in signal connection with and sending setpoints to a further control device, which setpoints said further control device then implements on the drive motor, the transmission and/or the clutch.

In one embodiment of the invention, the control device determines the target gear in the main transmission, and the drive position to be set in the rear-mounted group, as a function of a speed of the motor vehicle. The speed of the motor vehicle can be determined by the control device itself, for example from the rotational speed at the output of the transmission. Alternatively, the speed can be determined by a further control device of the motor vehicle and transmitted to the control device of the drive train.

The engaged gear in the main transmission and the set drive position in the rear-mounted group determine the overall transmission ratio of the transmission. At a given speed of the motor vehicle, the rotational speed of the transmission input shaft can be determined by means of the selection of the transmission ratio of the transmission. If the rotational speed of the drive motor can still be varied, for example if the drive motor is not completely out of operation, then the rotational speed of the drive motor can also be specified in this way. If the drive motor is set to a fixed rotational speed, the differential speed at the clutch can thereby be set to a minimum value. It is thereby possible to set the rotational speed of the transmission input shaft to a value which is optimal for the present situation.

In one embodiment of the invention, the control device determines the target gear in the main transmission, and the drive position to be set in the rear-mounted group, as a function of properties of the underlying surface. Properties of the road surface can for example be an incline gradient of the road surface or the curvature of a curve. The properties can either be measured by means of suitable sensors such as for example inclination sensors, longitudinal or transverse acceleration sensors or a steering angle sensor, or can be estimated by means of methods known to a person skilled in the art using operating variables of the motor vehicle such as for example acceleration, output torque of the drive motor and transmission ratio of the transmission. It is also possible to incorporate properties of the road surface situated ahead of the motor vehicle. Said properties can for example be read out from an on-board digital street map or detected by means of a camera.

It is thereby possible to determine the optimum transmission ratio of the transmission for the momentary driving situation. For example, in the event of a downhill gradient being detected, a relatively low transmission ratio and therefore a higher rotational speed of the transmission input shaft can be set in order to thereby obtain an increased braking effect of the drive motor. A lower transmission ratio would likewise be set before a curve or before a rising gradient in order to thereby provide for a sufficient amount of power of the drive motor.

In one embodiment of the invention, the control device sets a neutral position in the main transmission in phases in which no drive power of the drive motor is required, and thereby interrupts the drive connection between the drive motor and driven vehicle wheels. In said situations, therefore, the motor vehicle can roll without a braking action of the drive motor. The phases can for example be identified when a nominal torque of the drive motor, which is predefined by the vehicle driver by means of an accelerator pedal or an operating device for engine braking, is within a range around zero. When using such a function, there are time intervals, which can last several seconds, between the disengagement of the original gear and the engagement of the target gear. The risk of the drive motor switching to an emergency mode in such time intervals is therefore very high in relation to shifts which are carried out continuously. It is therefore particularly important that the engagement of the target gear can be ensured when using such a function.

The invention will become more readily apparent from the following description of exemplary embodiments of the invention illustrated in simplified form with reference to the accompanying drawings.

DESCRIPTION OF PARTICULAR EMBODIMENTS

Figure 1:
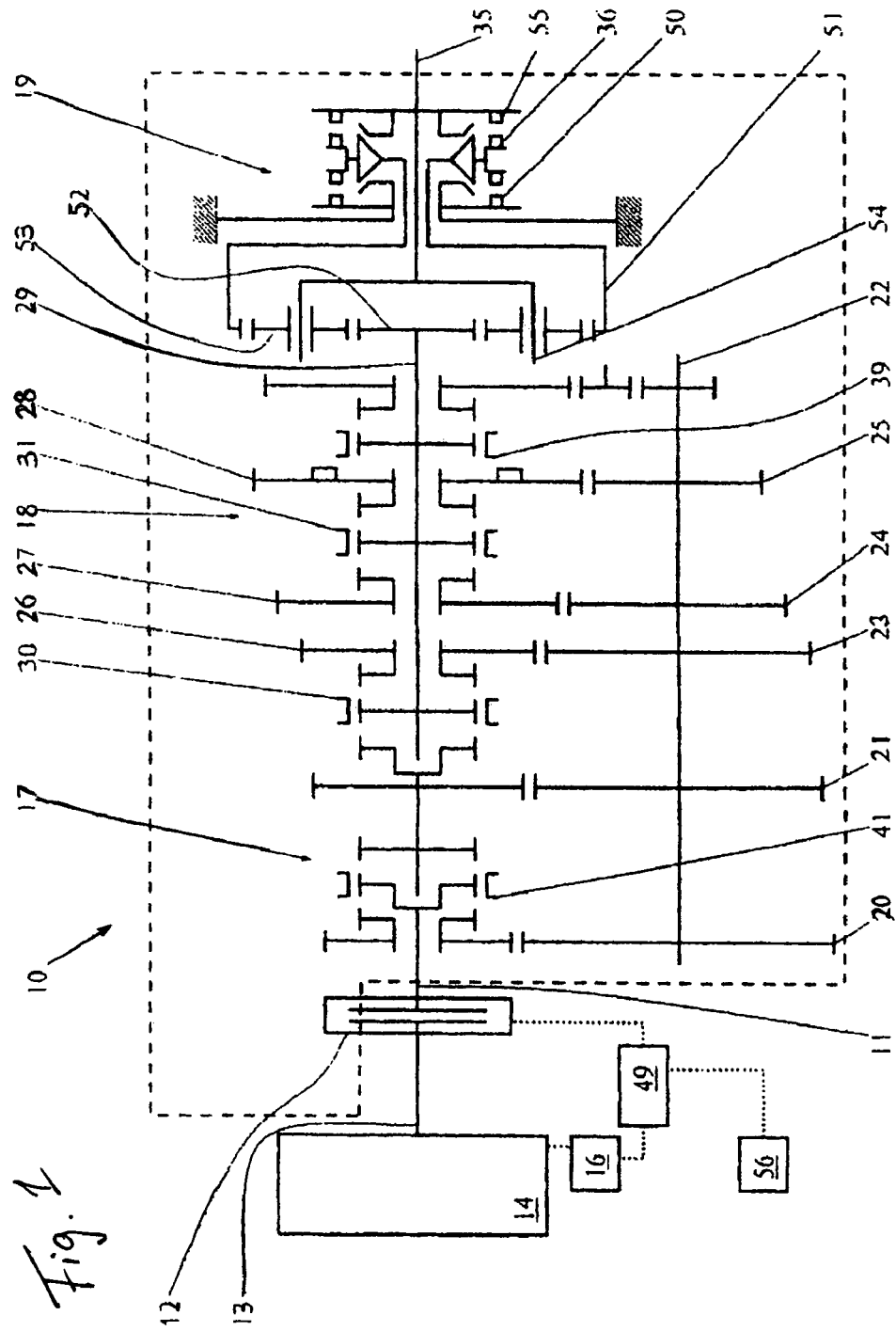
FIG. 1 shows a drive train of a motor vehicle and
FIG. 2 shows a flow diagram for a shifting procedure in the main transmission.

As shown in FIG. 1, a transmission 10 has a transmission input shaft 11 which can be coupled by means of a clutch 12, which is actuated by external forces, to an output shaft 13, which is arranged coaxially with respect to the transmission input shaft 11, of a drive motor 14. The clutch 12 can be opened and closed by means of a control element (not illustrated) which is actuated by a control device 49. The drive motor 14 is actuated by a control device 16. A rotational speed and an output torque of the drive motor 14 can be set by means of the actuation. The control device 49 can send setpoints for the rotational speed and the output torque of the drive motor 14 to the control device 16 which then implements said setpoints. The control device 49 thereby actuates the drive motor 14. The control device 49 is also signal-connected to an operating unit 56, by means of which a vehicle driver can initiate shifts in the transmission 10.

The transmission 10 is a so-called three-group transmission. A front-mounted group in the form of a split group 17 is arranged so as to be rotationally fixedly connected to the transmission input shaft 11. Connected downstream of the split group 17 is a main transmission 18 which is adjoined by a rear-mounted group in the form of a range group 19. The main transmission 18 is an unsynchronized gear change transmission. The main transmission 18 therefore does not have synchronizing devices for every gear.

By means of the split group 17, the transmission input shaft 11 can be operatively connected by means of two different gearwheel pairings 20, 21 to a countershaft 22 which is arranged parallel to the transmission input shaft 11. The gearwheel pairings 20, 21 have a different transmission ratio. Fixed wheels 23, 24, 25 for the $3^{rd}$, $2^{nd}$ and $1^{st}$ gears of the main transmission 18 are rotationally fixedly arranged on the countershaft 22. The fixed wheels 23, 24, 25 mesh in each case with associated loose wheels 26, 27, 28 which are rotatably mounted on a main shaft 29 which is arranged coaxially with respect to the transmission input shaft 11. The loose wheel 26 can be rotationally fixedly connected to the main shaft 29 by means of a sliding sleeve 30, and the loose wheels 27 and 28 can be rotationally fixedly connected to the main shaft 29 by means of a sliding sleeve 31. A $4^{th}$ gear of the main transmission is realized by virtue of the main shaft 29 being rotationally fixedly connected to the split group 17 by means of the sliding sleeve 30. The connection of the loose wheels 26, 27, 28 and the split group 17 to the main shaft 29 is possible only when the rotational speeds of the elements to be connected are approximately identical. The rotational speed alignment is carried out in a normal mode of the drive motor 14 by means of the drive motor 14.

Connected downstream of the main transmission 18 is the range group 19 which is designed in the manner of a planetary gear set. Two different transmission ratios can be provided by the range group 19. The transmission 10 therefore has a total of 16 gears.

In a first drive position of the range group 19, a ring gear 51 can be fixedly held by means of a brake 50 against a housing (not illustrated), so that a web 54 is driven by means of a sun gear 52, which is connected to the main shaft 29, and planet gears 53. The web 54 is connected to a transmission output shaft 35. In a second drive position, the ring gear 51 can be connected to the web (planet carrier) 54 by means of a transmission clutch 55, so that the sun 52, the web 54 and the ring gear 51 rotate as a block. The brake 50 and the transmission clutch 55 can be actuated by a sliding sleeve 36 and thereby act as synchronizers of the range group 19. If neither the brake 50 nor the transmission clutch 55 is actuated, there is no drive connection between the main shaft 29 and the transmission output shaft 35. The range group 19 is then in a neutral position.

From the transmission output shaft 35 which is arranged coaxially with respect to the main shaft 29, the converted torque and the rotational speed of the drive motor 14 are transmitted by means of a drive input shaft to an axle gearing which, in a way known per se, transmits the torque via two drive output shafts to driven vehicle wheels (not illustrated).

The sliding sleeves 30, 31, 36, 39 and 41 can be actuated, and the different gears thereby engaged and disengaged, by control elements (not illustrated) which are actuated by the control device 49. If the sliding sleeves 30, 31 and 39 of the main transmission 18 are not rotationally fixedly connected to any loose wheel, the main transmission 18 is in a neutral position. There is therefore no drive connection between the transmission input shaft 11 and the transmission output shaft 35.

Figure 2:
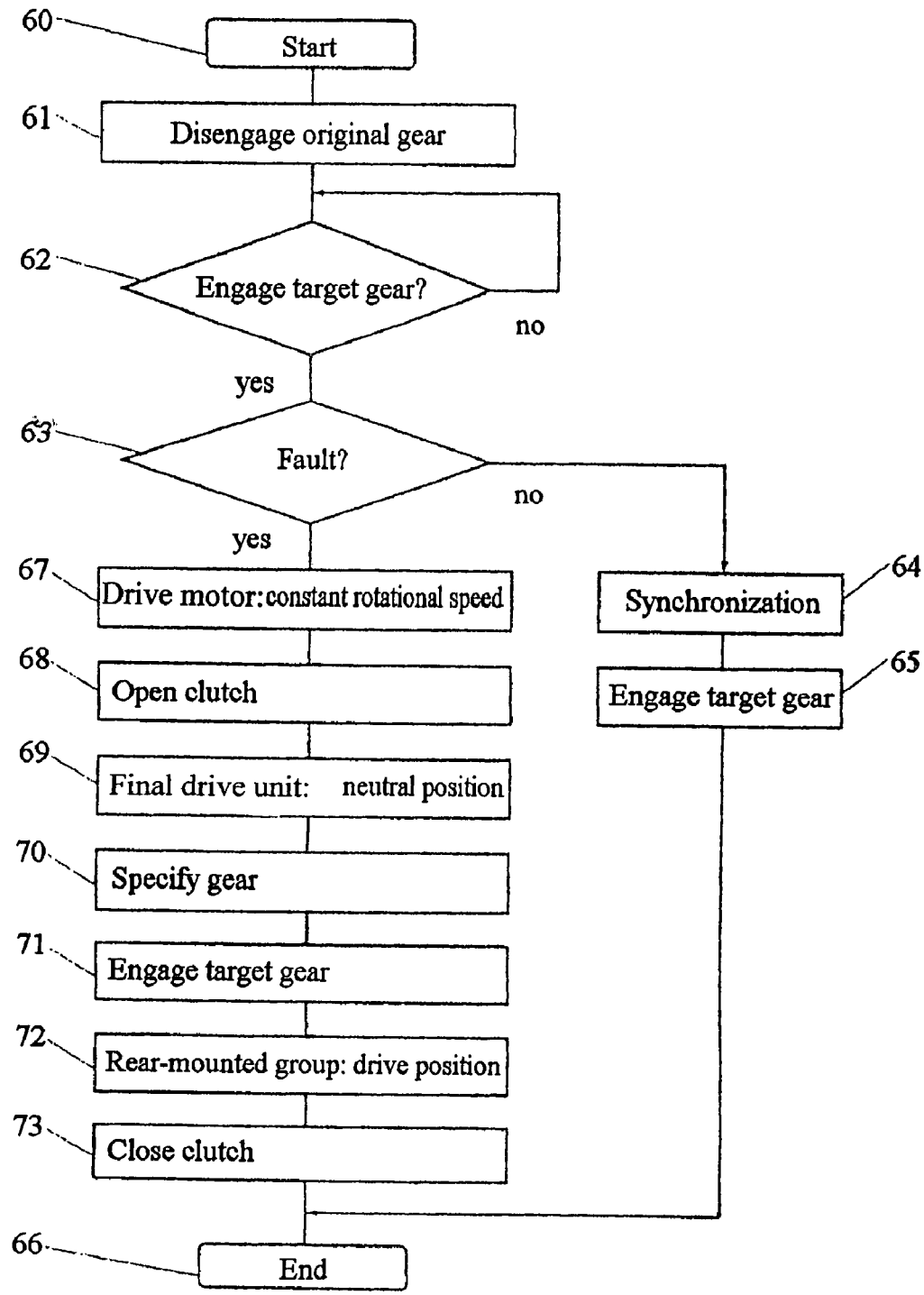

FIG. 2 illustrates a shifting procedure in the main transmission 18. The shift starts in block 60. The shift can be initiated either by the vehicle driver or by the control device 49. The control device 49 can for example initiate a shift when rotational speed limits for the drive motor 14 are exceeded or undershot. The control device 49 can also initiate a shift when a nominal torque for the drive motor 14 is within a range around zero.

In block 61, the original gear is disengaged by virtue of the connection of the loose wheel of the original gear to the associated sliding sleeve being disconnected. After the disengagement of the original gear, the main transmission 18 is in the neutral position.

In query block 62, it is checked as to whether the target gear should be engaged. This query is relevant when the original gear has been disengaged on account of a low nominal torque for the drive motor 14. If this is the case, then it is checked as to whether the nominal torque is now outside a specifiable range. If this is not the case, the neutral position should be maintained further and the query to the block 62 is repeated. In all other cases, the process is continued in query block 63.

In query block 63, it is checked as to whether an emergency mode of the drive motor 14 is present. Here, it is for example checked as to whether a sensor or a control element of the drive motor 14 has a malfunction. It is also checked as to whether the signal connection between the control devices 49 and 16 and between the control device 16 and the drive motor 14 is functioning correctly.

If no fault is present, then in block 64, the drive motor 14 is actuated such that the rotational speed of the transmission input shaft 11 is adjusted to the synchronous rotational speed of the target gear. Subsequently, in block 65, the target gear is engaged and the shift is ended in block 66.

If a fault is detected, that is to say the drive motor 14 is in an emergency operation mode, then in block 67, the drive motor 14 is actuated so as to generate a constant rotational speed. The rotational speed is in a range from 1150-1250 rev/min, that is to say for example 1200 rev/min.

In the subsequent block 68, the clutch 12 is opened. Subsequently, in block 69, the range group 19 is placed into neutral.

In the following block 70, the target gear to be engaged in the main transmission 18 and the drive positions to be set in the split group 17 and in the range group 19 are determined. For this purpose, the overall transmission ratios of all 16 gears of the transmission 10 are stored in the control device 49. Using the rotational speed of the transmission output shaft 35 which results from the speed of the motor vehicle, the control device 49 calculates the rotational speeds which would be generated in the individual gears. Also stored in the control device 49 is a rotational speed range in which the rotational speed of the transmission input shaft 11 should lie after the shift. The range may be dependent on the speed of the motor vehicle or the type of fault of the drive motor 14. The control device 49 then checks to determine in which gear a rotational speed within the rotational speed range would be obtained. The control device 49 selects one of said gears, whereby the target gear of the main transmission 18 and the drive positions of the split group 17 and of the range group 19 are determined.

The selection of one of the possible gears or the rotational speed range can also be dependent on an uphill or downhill road surface. If the road is inclined upwardly, then, for example, the lowest of the possible gears is selected and the rotational speed range is moved in the direction of higher rotational speeds.

After the target gear in the main transmission 18 is determined, the target gear is engaged in block 71, and if appropriate the drive position of the split group 17 is changed. Subsequently, in block 72, the drive position of the range group 19 is set, before the clutch 12 is closed in block 73.

The shift therefore likewise ends in block 66.

As an alternative to the described determination of the target gear and of the drive positions, it is also possible for a desired rotational speed for the rotational speed of the transmission input shaft 11 to be specified and a desired transmission ratio of the transmission 10 to be calculated therefrom. It is subsequently checked as to which gear is closest to said desired transmission ratio. Said gear is then selected. The desired rotational speed can likewise be variable, in the same way as the described rotational speed range.

What is claimed is:

1. A method of operating a drive train of a motor vehicle, having
    a drive motor (14),
        a shift transmission (10) which is actuated by an external force and includes an unsynchronized main transmission (18) and a synchronized final drive unit (19),
        a clutch (12) which is actuated by an external force and is arranged between the drive motor (14) and the shift transmission (10), and
        a control device (49) for operating the drive motor (14), the transmission (10) and the clutch (12),
    wherein, in a normal mode of the drive motor (14) in the event of a shift to a target gear in the main transmission (18), a synchronization of a transmission input shaft (11) to a synchronous rotational speed of the target gear is carried out by the drive motor (14),
    for engaging the target gear in an emergency mode of the drive motor (14), the following steps are carried out:
        opening the clutch (12),
        setting a neutral position in the final drive unit (19),
        engaging the target gear,
        setting a drive position in the final drive unit (19) and
        at least partially closing the clutch (12).

2. The method as claimed in claim 1, wherein the target gear in the main transmission (18), and the drive position to be set in the final drive unit (19), are determined by the control device (49) as a function of a travel speed of the motor vehicle.

3. The method as claimed in claim 2, wherein the target gear in the main transmission (18), and the drive position to be set in the final drive unit (19), are determined by the control device (49) as a function of properties of a road surface on which the motor vehicle is driving.

4. The method as claimed in claim 3, wherein, with the transmission (10) including a front-mounted unit (17), the method comprises the steps of:
   establishing by the control device (49) a drive position to be set in the front-mounted unit (17) as a function of the travel speed of the motor vehicle, and
   establishing the drive position in the front-mounted unit (17) before the closure of the clutch (12).

5. The method as claimed in claim 4, wherein for a drive position to be engaged in at least one of the front-mounted unit (17) and the target gear in the main transmission (18), the drive position which is to be engaged in the final drive unit (19) is determined by the control device (49) in such a way that, at the momentary speed of the motor vehicle, the rotational speed of the transmission input shaft (11) is in a certain rotational speed range.

6. The method as claimed in claim 1, wherein, in phases in which no drive power of the drive motor (14) is required, a neutral position in the main transmission (18) is established by the control device (49).

7. The method as claimed in claim 1, wherein a constant rotational speed of the drive motor (14) is set in an emergency mode of operation of the drive motor (14).

8. The method as claimed in claim 7, wherein the rotational speed of the drive motor (14) in an emergency mode of operation is between 1150 and 1250 rev/mm.

* * * * *